United States Patent
Brezowsky et al.

(10) Patent No.: US 10,900,446 B2
(45) Date of Patent: Jan. 26, 2021

(54) DEVICE FOR HEAT TRANSFER

(71) Applicant: Hanon Systems, Daejeon (KR)

(72) Inventors: Mirko Brezowsky, Bergheim (DE); Guillaume Hebert, Stare Mesto (CZ); Andrej Repa, Dolna Suca (SK); Milan Risian, Martin (SK)

(73) Assignee: HANON SYSTEMS, Daejeon (KR)

( * ) Notice: Subject to any disclaimer, the term of this patent is extended or adjusted under 35 U.S.C. 154(b) by 61 days.

(21) Appl. No.: 16/219,104

(22) Filed: Dec. 13, 2018

(65) Prior Publication Data
US 2019/0186434 A1 Jun. 20, 2019

(30) Foreign Application Priority Data

Dec. 15, 2017 (DE) .................. 10 2017 130 153

(51) Int. Cl.
*F02M 26/32* (2016.01)
*F02M 26/28* (2016.01)
*F02G 5/02* (2006.01)
*F28D 7/16* (2006.01)
*F28D 21/00* (2006.01)
*F28F 9/00* (2006.01)
(Continued)

(52) U.S. Cl.
CPC .......... *F02M 26/32* (2016.02); *F01N 3/0205* (2013.01); *F02G 5/02* (2013.01); *F02M 26/28* (2016.02);
(Continued)

(58) Field of Classification Search
CPC ......... F02M 26/32; F02M 26/28; F28F 9/001; F28F 9/0131; F28F 21/08; F28F 21/062;
(Continued)

(56) References Cited

U.S. PATENT DOCUMENTS

2006/0048921 A1* 3/2006 Usui .................... F28D 7/1684
165/109.1
2008/0141985 A1* 6/2008 Schernecker .......... F02M 26/25
123/568.12
(Continued)

FOREIGN PATENT DOCUMENTS

CN 106989622 A1 7/2017
DE 102007054913 A1 8/2008
(Continued)

OTHER PUBLICATIONS

DE Office Action dated Sep. 3, 2018; Application No. 10 2017 130 153.4.
(Continued)

*Primary Examiner* — Hoang M Nguyen
(74) *Attorney, Agent, or Firm* — McLean IP Global; Jason Y. Pahng (57) ABSTRACT

Device for heat transfer and method for making it, the device having a housing with a heat exchanger disposed within and completely enclosed by the housing having a receiving element and cover element integrated within receiving element. First fluid flows through heat exchanger to be cooled; another fluid flows around heat exchanger. Heat transfer elements are shaped as a plate of a first jacket element and a second jacket element as well as a fin element; each includes a throughflow sector for inflow and outflow of first fluid. Each throughflow sector is developed on a front face of heat transfer element. Fin element has a lesser dimension in a longitudinal direction than jacket elements and is disposed therebetween such that in the proximity of a second front face, located distally to first front face, a free region is developed for deflecting direction of flow of first fluid.

15 Claims, 2 Drawing Sheets

(51) Int. Cl.
| | |
|---|---|
| *F28F 9/013* | (2006.01) |
| *F28F 21/08* | (2006.01) |
| *F28F 21/06* | (2006.01) |
| *F01N 3/02* | (2006.01) |
| *F28F 1/40* | (2006.01) |
| *F28F 3/04* | (2006.01) |
| *F28F 1/02* | (2006.01) |

(52) U.S. Cl.
CPC ......... *F28D 7/1623* (2013.01); *F28D 7/1653* (2013.01); *F28D 7/1684* (2013.01); *F28D 7/1692* (2013.01); *F28D 21/0003* (2013.01); *F28F 1/40* (2013.01); *F28F 3/044* (2013.01); *F28F 9/001* (2013.01); *F28F 9/0131* (2013.01); *F28F 21/062* (2013.01); *F28F 21/08* (2013.01); *F01N 2240/02* (2013.01); *F28F 2001/027* (2013.01)

(58) Field of Classification Search
CPC ........ F28F 1/40; F28F 3/044; F28F 2001/027; F28D 7/1623; F28D 7/1692; F28D 7/1653; F28D 7/1684; F28D 21/0003; F01N 3/0205; F01N 2240/02; F02G 5/02
USPC ......................................................... 60/605.2
See application file for complete search history.

(56) References Cited

U.S. PATENT DOCUMENTS

| | | | | |
|---|---|---|---|---|
| 2009/0260786 A1* | 10/2009 | Palanchon | ............ | F28D 9/0031 165/176 |
| 2010/0300647 A1* | 12/2010 | Steurer | ................. | F28D 7/1684 165/52 |
| 2011/0132586 A1* | 6/2011 | Diehl | ........................ | F28D 7/06 165/157 |
| 2015/0027673 A1 | 1/2015 | De Francisco Moreno et al. | | |
| 2015/0184946 A1* | 7/2015 | Barwig | .................. | F02M 26/32 123/542 |

FOREIGN PATENT DOCUMENTS

| | | |
|---|---|---|
| DE | 102008001659 A1 | 1/2009 |
| DE | 102008001660 A1 | 1/2009 |
| DE | 102008002430 A1 | 1/2009 |
| DE | 102007054953 A1 | 5/2009 |
| DE | 102008024569 A1 | 12/2009 |
| DE | 102013221151 A1 | 4/2015 |
| EP | 2957852 A1 | 12/2015 |
| EP | 3193120 A1 | 7/2017 |
| JP | 2015025649 A | 2/2015 |
| JP | 5988296 B2 | 9/2016 |
| JP | 5997433 B2 | 9/2016 |
| KR | 101554048 B1 | 9/2015 |
| WO | 2014136024 A1 | 9/2014 |

OTHER PUBLICATIONS

KR Office Action dated Jan. 23, 2020; Application No. 10-2018-0155149.
CN Office Action dated Mar. 19, 2018; Application No. 2018 11542482.8.

* cited by examiner

DEVICE FOR HEAT TRANSFER

This application claims priority from German Patent Application No. 102017130153.4 filed on Dec. 15, 2017, which is hereby incorporated in reference in their entirety.

The invention relates to a device for the transfer of heat, in particular for cooling the exhaust gas in motor vehicles. The heat is herein preferably transferred between the exhaust gas and a liquid coolant. The device comprises a housing with a heat exchanger disposed within a volume completely enclosed by the housing.

Prior art discloses systems for exhaust gas recirculation in motor vehicles. With these systems the nitrogen oxides in the exhaust gases, in particular in the exhaust gases of diesel-operated motor vehicles, are reduced and the consumption of gasoline-operated motor vehicles is decreased. In the generic systems of exhaust gas recirculation cooled or non-cooled exhaust gas is mixed into the fresh air drawn into the engine.

Especially with the use of lean mixtures, that is in the partial-load operational range, environmentally harmful nitrogen oxides are generated in the engines of motor vehicles during combustions at high temperatures. To decrease the emission of the nitrogen oxides it is necessary to lower the high temperature peaks and decrease the air excess during combustion. Through lower oxygen concentrations of the fuel-air mixture the velocity of the process of combustion, and therewith the maximal combustion temperatures, is reduced. Both effects are attained through the addition of a subflow of the exhaust gas to the fresh air flow drawn into the engine.

In addition to a decrease of the oxygen component and the lowering of the temperature peaks during combustion, in diesel-operated motor vehicles a system of exhaust gas recirculation also results in lessening the noise emission. In gasoline-operated motor vehicles with a system of exhaust gas recirculation, moreover, the throttle losses are reduced.

However, by mixing the recirculated exhaust gas flow at high temperatures the cooling effect, and therewith also the efficiency, of the engine is reduced. To counteract these reductions, the exhaust gas is cooled in a heat exchanger, the so-called exhaust gas heat exchanger or exhaust gas recirculation cooler, before being added. In gasoline-operated motor vehicles, the additional cooling of the exhaust gas effects an increase of the compression ratio of the air supplied to the engine.

The exhaust gas recirculation, abbreviated EGR, is operated in diesel-engine driven motor vehicles as high-pressure EGR as well as in motor vehicles driven by spark ignition engines as low-pressure EGR. When operated as low-pressure EGR, in addition, a distinction is made between removal of the exhaust gas for recirculation before an exhaust gas after-treatment, for example by means of a catalyst or the like, and after an exhaust gas after-treatment. Furthermore, the conjoint use of a high-pressure EGR and a low-pressure EGR in connection with an engine including an exhaust gas turbocharger is known.

Apart from the exhaust gas recirculation cooler, systems for exhaust gas recirculation in general comprise an EGR valve, most frequently developed as a seat plate valve, as well as a bypass line with a bypass valve, most frequently developed as a flap valve or plate valve, or an electric plug socket or a pressure sensor.

Within prior art a diversity of implementations of exhaust gas heat exchangers are known. However, increasingly stricter legislations regarding exhaust gas standards and consumption requirements made of motor vehicles demand increased cooling needs at increasingly diminishing space requirements of the components in the motor vehicle. These contrary requirements are rarely met by the known exhaust gas heat exchangers.

DE 10 2007 054 953 A1 discloses an exhaust gas recirculation system of an internal combustion engine with an air-cooled exhaust gas recirculation cooler. The exhaust gas recirculation cooler comprised of aluminum comprises double-flow cooling tubes which open out into single-flow connection pieces. By dividing the exhaust gas flow over two cooling tubes the heat transfer surface is enlarged and therewith the cooling performance is raised. The double-flow cooling tubes, additionally connected with one another across cooling fins, are triply wound in the shape of a U.

DE 10 2007 054 913 A1 describes a heat exchanger, in particular for a motor vehicle, with one or more flow channels through which flows a fluid. The flow channels provided in an extrusion section most frequently have at least sectionally a curved course to increase the heat transfer capacity. According to one form of the heat exchanger the extrusion sections are curved in the shape of a U. About the outer walls of the extrusion section flows a coolant while the exhaust gas flows along the inner wall.

DE 10 2008 024 569 A1 discloses an exhaust gas cooler that comprises a housing with a bypass channel and a cooling zone. In the cooling zone an exhaust gas cooling channel is disposed developed of straight cooling tubes and deflection chambers. The housing comprises a control element for the control of the exhaust gas flow either through the bypass channel or through the cooling zone. During its flow through the cooling zone the exhaust gas flow is deflected multiple times, wherein the exhaust gas cooling channel comprises an entry cooling channel, a deflection channel adjoining thereto and an exit cooling channel adjoining the deflection channel. In the deflection channel the exhaust gas flow flows counter to the direction of flow of the entry or exit cooling channel. Due to the deflections, the exhaust gas flow to be cooled flows at least four times through the cooling zone of the housing. About the cooling tubes flows the coolant while the exhaust gas flows through the cooling tubes.

DE 10 2008 001 659 A1, DE 10 2008 001 660 A1 and DE 10 2008 002 430 A1 also disclose each a heat exchanger for an exhaust system tract of a motor vehicle with an exhaust-gas conducting heat transfer tube disposed in a closed housing or a bundle of fluidically parallel connected heat transfer tubes disposed in a closed housing. The coolant is conducted through the housing and flows about the outside of the heat transfer tube or the heat transfer tubes, respectively.

The exhaust gas recirculation systems known in prior art comprise gas-gas and gas-coolant heat exchangers, wherein the gas-coolant heat exchangers in particular are implemented as tubular bundle heat exchangers, which, again, are implemented as exhaust gas heat exchangers in pure straight-I-flow or U-flow. With their disposition of the gas inlet and the gas outlet on one line, the pure straight-I-flow heat exchangers have lesser pressure losses at the exhaust gas side, however at simultaneously lower cooling capacity. In the case of the exhaust gas heat exchangers with U-flow the gas inlet and the gas outlet are disposed on one side of the heat exchanger.

Conventional U-flowthrough exhaust gas heat exchangers, developed as plate heat exchangers, of the exhaust gas recirculation systems comprise at a second end, disposed distally with respect to a first end developed as inlet and outlet for the exhaust gas, deflection elements which, as supplementary elements, are soldered or welded to the plates. Due to the overflow of the exhaust gas from the tubes of the tubular bundle heat exchangers or from the plates of the plate heat exchangers into deflection chambers and the subsequent flow into the tubes or plates, very high pressure losses at good cooling capacity occur at the exhaust gas side.

The invention addresses the problem of providing a device for efficient heat transfer between two fluids, in particular for exhaust gas cooling in motor vehicles by means of a liquid coolant. At high thermal efficiency a maximal heat capacity at simultaneously low pressure loss of the fluids, that is specifically of the exhaust gas and the coolant, is intended to be transferable with the heat exchanger. The heat exchanger, moreover, is to be space-saving due to its compact architecture and only have a minimal structure size or have minimal space requirements. The heat exchanger, furthermore, shall involve minimal production and material costs.

The problem is resolved through the subject matters with the characteristics of the independent patent claims. Further developments are specified in the dependent patent claims.

The problem is resolved through a device for heat transfer, in particular for exhaust gas cooling in motor vehicles. The device comprises a housing with a heat exchanger disposed within a volume completely enclosed within the housing. The housing is implemented in two parts with a receiving element and a cover element. The heat exchanger is integrated within the receiving element and is developed of parallel disposed heat transfer elements through which flows a first fluid, in particular the exhaust gas, to be cooled and about which flows a liquid second fluid, in particular a coolant.

According to the concept of the invention the heat transfer elements are each developed in plate-form from a first jacket element and a second jacket element as well as a fin element. Each heat transfer element comprises a throughflow sector for the inflow and outflow of the first fluid. Each throughflow sector is implemented on a front face of the heat transfer element. In the longitudinal direction the fin element has a lesser dimension than the jacket elements and is disposed between the jacket elements such that in the proximity of a second front face, disposed distally with respect to the first front face, of the heat transfer element a free region is developed for the deflection of the direction of flow of the first fluid such that a U-flow through the heat transfer element is generated by the first fluid.

The housing hermetically seals the heat exchanger against the surrounding, wherein between the receiving element and the cover element a sealing element is advantageously disposed.

According to a further development of the invention the cover element of the housing is provided with an inlet opening for the second fluid as well as an inlet opening and an outlet opening for the first fluid. The receiving element of the housing comprises an outlet opening for the second fluid.

According to a preferred implementation of the invention a strip-form flow guide means is disposed in a direction, orthogonal to the longitudinal direction, of a height in the throughflow sector of the heat transfer elements. The flow guide means divides each throughflow sector of the heat transfer elements into two, in particular equal-sized, flow cross sections for the first fluid.

A further advantageous implementation of the invention comprises that within the receiving element of the housing a flow guidance element for the second fluid is disposed, whose wall is developed such that it encompasses the heat exchanger at least at the side faces deviating from the front faces, in particular of an upper side and an underside as well as two side faces.

The flow guidance element, consequently disposed between the wall of the receiving element and the heat exchanger, advantageously has the form of a casing element, encompassing the heat exchanger on the longitudinal sides, with an open first front face and an open second front face. The front faces are disposed such that they delimit the flow guidance element in the longitudinal direction.

The form and the outer dimensions of the wall of the flow guidance element herein preferably correspond to the form and the inner dimensions of the wall of the receiving element of the housing less an amount for forming a gap to introduce the flow guidance element into the receiving element.

The inner dimensions of the wall of the flow guidance element are advantageously such that between an inside of the wall of the flow guidance element and the heat exchanger a gap is formed for the second fluid to flow through.

According to a further development of the invention the wall of the flow guidance element is provided on a first narrow side with inlet openings and/or a flow gap for the second fluid to flow into a volume encompassed by the flow guidance element.

The inlet openings are in each case advantageously disposed next to one another forming a matrix in the directions of height and longitude. In the direction of height the inlet openings are preferably disposed in three rows one above the other. Herein each row oriented in the longitudinal direction is formed of at least two, preferably of five, inlet openings. The inlet openings disposed in a row advantageously have flow cross sections of equal size.

According to a preferred implementation of the invention the wall of the flow guidance element is provided with a cutout on a broadside, disposed toward an outlet opening of the second fluid, of the housing. The cutout is advantageously developed such that it extends in the longitudinal direction from a first front face, oriented toward an open front face of the receiving element, of the flow guidance element.

The flow guidance element is preferably produced integrally as a single-piece component.

According to a further advantageous implementation of the invention the flow guidance element is developed of a synthetic material or of a metal material, in particular of an aluminum or a stainless steel material.

The heat transfer elements are preferably produced of a metal material, also in particular of an aluminum or of a stainless steel material. The housing is advantageously also implemented of a metal material such as an aluminum or a stainless steel material, or of a synthetic material.

The problem is also resolved through a method according to the invention for the production of the device for heat transfer, in particular for exhaust gas cooling in motor vehicles, with a housing and a heat exchanger disposed within a volume completely enclosed by the housing. The method comprises the following steps:

fitting together one first jacket element and one second jacket element of a heat transfer element as well as disposing a fin element between the jacket elements such that an open throughflow sector is developed and side edges of the jacket elements are in contact with one another, stacking the heat transfer elements with their broadsides toward one another, and fixing the heat transfer elements at longitudinal sides by means of securement elements as well as disposing a profiled retaining section on a side formed by the through-flow sectors, connecting the components of the heat exchanger, placing a flow guidance element over the heat transfer elements disposed on the outside of the heat exchanger, sliding the heat exchanger with the flow guidance element into a receiving element of the housing, as well as closing the housing by placing a sealing element and a cover element onto the receiving element.

The receiving element and the cover element of the housing are securely connected with one another, wherein the receiving element and the cover element are preferably connected with one another across threaded connections. As securement elements bolts are used herein.

According to a further development of the invention the heat transfer elements are disposed such that they each align on their narrow sides and front faces.

A special advantage comprises that the components of the heat exchanger are connected with one another by soldering or welding.

The device for heat transfer according to the invention, developed as a highly efficient exhaust gas recirculation cooler, termed exhaust gas cooler for short, in particular for the reduction of harmful emissions in gasoline-operated engines and diesel engines as well as for the efficiency enhancement in engines operated with gasoline, is operable with high cooling capacity at simultaneously low pressure loss and comprises additional diverse advantages:

transfer of maximal heat capacity at minimal architectural size or minimum installation space requirement, meaning at optimal ratio of transferable heat capacity to the built-out volume, smaller dimensioning—or even omission—of alternative nitrogen oxide reduction measures in diesel fuel-operated vehicles or consumption diminishing measures in motor vehicles operated with gasoline, and therewith decrease of vehicle mass, maximal service life by avoiding thermal stresses in the materials, as well as minimal costs in the production and minimal material expenditures through simple structure and small number of components, in addition, reduction of fuel consumption and increase in the reduction of nitrogen oxides in the exhaust gas.

Further details, characteristics and advantages of implementations of the invention are evident in the following description of an embodiment example with reference to the associated drawing. Therein is depicted the device for heat transfer.

Figure 1:
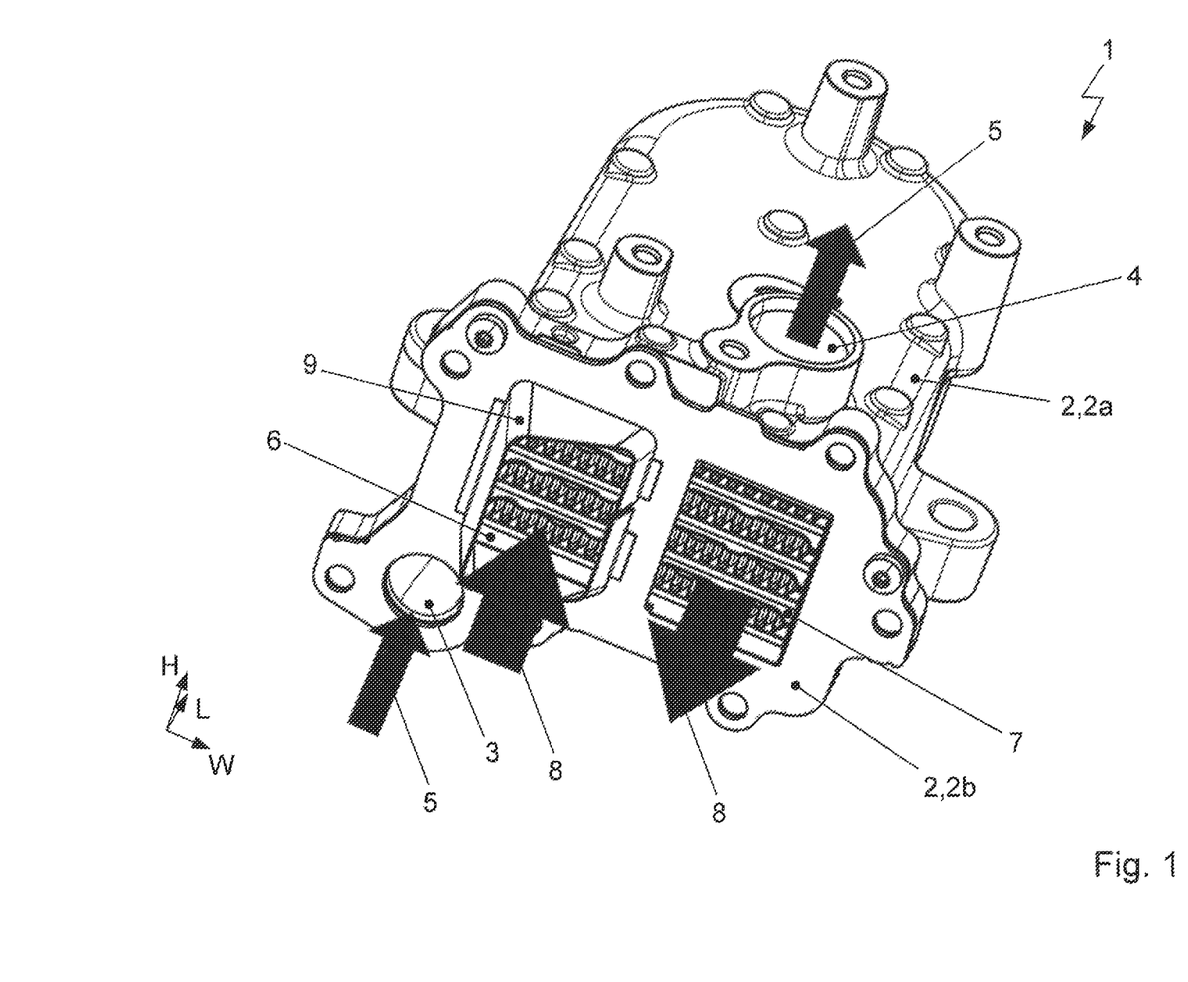
FIG. 1: in the assembled state with the housing closed and the flow directions, indicated by arrows, of the two fluids exhaust gas and coolant through the housing in perspective view as well as FIG. 2: as individual components with the housing, a heat exchanger and a flow guidance element for the coolant in exploded view.

In FIG. 1 is shown the device 1, developed as exhaust gas cooler, for the heat transfer in an assembled state with a closed housing 2, 2a, 2b and with flow directions 5, 8, indicated by arrows, of the two fluids exhaust gas and coolant, through the housing 2, 2a, 2b in perspective view.

The housing 2 is substantially developed in two parts from a receiving element 2a and a cover element 2b. To close the housing 2, the cover element 2b is disposed on receiving element 2a on an open front face of the receiving element 2a.

The coolant flows in the direction of flow 5 through an inlet opening 3, implemented in the cover element 2b, in a longitudinal direction L into the housing 2 and out again through an outlet opening 4, developed in the receiving element 2a, in a direction of height H out of the housing 2. The inlet opening 3 is disposed on the front face and the outlet opening 4 on an upper side of housing 2.

In addition to the inlet opening 3 for the coolant, the cover element 2b comprises an inlet opening 6 as well as an outlet opening 7 for the exhaust gas. The inlet opening 6 and the outlet opening 7 of the exhaust gas are disposed on the front face of housing 2, and thus at a first end of the device 1 in a direction of width W, next to one another.

The exhaust gas flows in a direction of flow 8 through the inlet 6 into housing 2 and through outlet 7 out of housing 2 again, wherein the coolant and the exhaust gas flow nearly in parallel, offset with respect to one another in the direction of height H, through the cover element 2b into the housing 2. The exhaust gas flows additionally in a flow direction 8, oriented substantially parallel to the inflow direction, out of the housing 2. During its inflow into housing 2, the exhaust gas is guided through a flow guidance element 9 which is disposed upstream of the inlet 6 in the direction of flow 8 of the exhaust gas.

The exhaust gas to be cooled flows within housing 2 through heat transfer elements while the coolant taking up the heat from the exhaust gas flows in the interspace about the heat transfer elements as well as in the interspace between the heat transfer elements and the wall of housing 2 or an additional flow guidance element.

Figure 2:
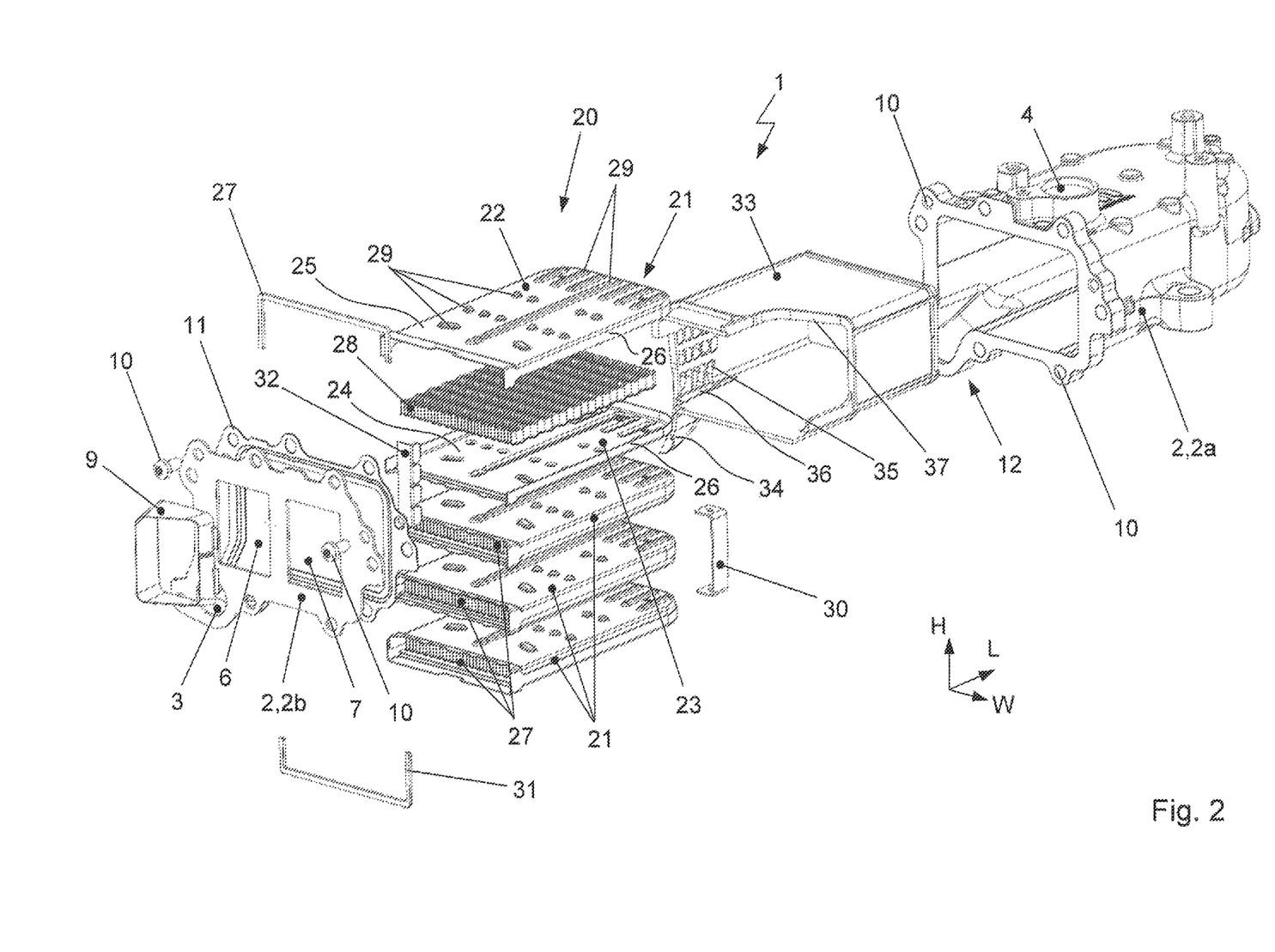

FIG. 2 shows in exploded view the device 1 for heat transfer from FIG. 1 as individual components with housing 2, 2a, 2b, a heat exchanger 20 and a flow guidance element 33 for the coolant.

In addition to the cover element 2b, the two-part housing 2 comprises the tub-form receiving element 2a with the open front face. The cover element 2b is developed such that, in combination with the receiving element 2a, it completely encompasses a volume. In the assembled state of device 1, the receiving element 2a and the cover element 2b correspond to one another. As single elements, the receiving element 2a and the cover element 2b can be simply fitted together and assembled.

At the open side the receiving element 2a, substantially having a rectangular cross section, is herein implemented with securement receptacles of connection elements 10, for example of threaded connections. In the assembled state of device 1 the securement receptacles of the receiving element 2a correspond with through-openings of the cover element 2b such that the through-openings and the securement receptacles are disposed one above the other and the securement elements, in particular bolts, can be introduced with the shaft through the through-openings into the securement receptacles and therewith the cover element 2b and the receiving element 2a can be securely and firmly connected with one another. Housing 2 is closed by means of the connection elements 10 developed as threaded connections.

The housing 2 is preferably implemented of a metal, for example aluminum. The receiving element 2a of housing 2 is connected with the cover element 2b by means of threaded connection as well as sealed off coolant-tight and exhaust gas-tight against the surroundings using a sealing element 11 developed as a sealing ring. The sealing element 11, advantageously implemented as a metal seal, in addition prevents the mixing of exhaust gas and coolant in the interior of housing 2. During the assembly of the device 1 the sealing element 11 is placed between the cover element 2b and the receiving element 2a.

The housing 2 could alternatively also be implemented of a synthetic or a stainless steel material.

In the proximity of the open front face the receiving element 2a is provided with an inlet sector 12 for the coolant. Consequently, the otherwise substantially rectangular cross section of the receiving element 2a comprises in the proximity of the open front face an outforming which is developed such that it has at the front face its maximal extent and tapers in a longitudinal direction L.

Within housing 2, that is within the volume enclosed by housing 2, the heat exchanger 20 is disposed. The housing 2 hermetically seals the heat exchanger 20 against the surroundings.

In the embodiment according to FIG. 2 the heat exchanger 20 is formed by four plate-shaped heat transfer elements 21. Each heat transfer element 21 comprises a first, upper jacket element 22, as well as a second, lower jacket element 23 that are preferably formed of metal sheets disposed in a plane, oriented by means of the directions of width W and length L, with an inside 24 and an outside 25.

The outer edges of the metal sheets are peripherally deformed, wherein the metal sheet in the proximity of a first front face is each deformed in the direction of the height H toward the outside 25 and each edge of the first front face is oriented parallel to the metal sheet.

The edges of oppositely disposed longitudinal sides and of a second front face, disposed distally with respect to the first front face, are bent at an angle of 90° in a common direction toward the inside 24. The edges, angled with respect to the metal sheet toward the inside 24, form each a coherent and closed side edge 26 of the jacket element 22, 23 and, in the proximity of the first front side, are widened, which means the side edge 26 in this region has in the direction of height H a greater extent than the side edge 26 peripheral on the metal sheet.

The side edges 26 of jacket elements 22, 23 are developed such that in each instance one upper jacket element 22 with the inside 24 and a lower jacket element 23 with its outside 25 are aligned with each other and can be fitted together. After they have been fitted together, the side edges of the jacket elements 22, 23 of a heat transfer element 21 overlap one another and are fully in contact with one another such that the heat transfer element 21 is peripherally closed at the longitudinal sides and the second front face. Due to the deformation of the metal sheets in the direction of height H, an extensive throughflow sector 27 for the exhaust gas into the heat transfer element 21 and out of the heat transfer element 21 is provided on the first front face. The throughflow sector 27 of heat transfer element 21 has a greater flow cross section for the exhaust gas differing in comparison to the throughflow sector 27.

Between the first jacket element 22 and the second jacket element 23 of each heat transfer element 21 is disposed a fin element 28 developed wave-shaped in the longitudinal direction L, which fills out the volume enclosed by the heat transfer element 21 in the direction of height H and direction of width W. With the wave-shaped development of the fin element 28 the flow channels of the exhaust gas through the fin element 28, and therewith through the heat transfer element 21, are lengthened.

The fin element 28 is in contact on the insides 24 of the jacket elements 22, 23. In the proximity of the longitudinal sides a gap remains between the fin element 28 and the side edge 26 of the jacket elements 22, 23, which gap is of the order of magnitude of the distance of the fins of the fin element 28.

However, in the longitudinal direction L the extent of the fin element 28 is markedly less than the extent of the heat transfer element 21. By disposing the fin element 28 with a first front face in the throughflow sector 27 of heat transfer element 21 as well as the lesser extent in the longitudinal direction L, a free space remains between a second front face of fin element 28 and the side edge 26 of heat transfer element 21 for deflecting the direction of flow 8 of the exhaust gas within the heat transfer element 21. With the deflection of the direction of flow 8 of the exhaust gas, which therewith becomes feasible, the exhaust gas can be guided in the opposite directions of flow through the heat transfer element 21. The exhaust gas flows herein through the inlet 6 into the device 1 and through the throughflow sector 27 into a heat transfer element 21 and in the longitudinal direction L through a first zone of the heat transfer element 21. The direction of flow of the exhaust gas is subsequently reversed within the heat transfer element 21 such that the exhaust gas flows in the reverse direction through a second zone of the heat transfer element 21 before the exhaust gas is discharged from the device 1 through outlet 7.

The heat exchanger 20 is developed as a U-flow exhaust gas heat exchanger with a markedly longer cooling path for the exhaust gas in comparison to a straight-I-flow heat exchanger. Deflection elements that are soldered or welded on are omitted.

Jacket elements 22, 23 are additionally provided with outformings 29 directed in the direction toward the outside 25. Herein the extent of the outformings 29 corresponds to the extent of the widenings in the proximity of the first front face of the metal sheet in the direction of height H and therewith to half the distance of adjacently disposed heat transfer elements 21. With the upper sides functioning as spacers, the outformings 29 of adjacently disposed jacket elements 22, 23 of adjacently disposed heat transfer elements 21 are in contact with one another such that between the heat transfer elements 21 a defined distance is generated as a flow path for the coolant flowing about the heat transfer elements 21. In addition, the contacting outformings 29 can contribute as flow guide means to the turbulence of the flow of the coolant within the heat exchanger 20. In this way, the heat transfer elements 21, disposed with their broadsides toward one another as well as in parallel, are aligned such that between directly adjacent heat transfer elements 21 in each case a flow path for the coolant is generated.

During the assembly of device 1, in particular of heat exchanger 20, the heat transfer elements 21 are stacked one above the other in the direction of height H such that the side edges 26 and the throughflow sectors 27 are aligned with one another. The heat transfer elements 21 are fixed with respect to one another at the longitudinal sides across at least one securement element 30. The clamp-shaped securement elements 30 are placed over the exterior of heat transfer elements 21 such that the heat transfer elements 21 are retained stacked one below the other forming the heat exchanger 20.

In the throughflow sector 27 of the heat transfer elements 21 the heat transfer elements 21 are additionally connected one with the other across a profiled frame-shaped retaining section 31. Serving for example also as a soldering support, the profiled retaining section 31, also termed solder frame, is comprised of two parts and is disposed such that it is peripheral about the throughflow sectors 27 of the heat transfer elements 21, which throughflow sectors 27 form a common inlet for the exhaust gas into the heat exchanger 20.

In the throughflow sector 27 of the heat transfer elements 21 is additionally provided a strip-form flow guide means 32 oriented in the direction of height H, which means, for one, fixes the heat transfer elements 21 one below the other and, for another, divides each throughflow sector 27 into two equal-sized flow cross sections for the exhaust gas. This ensures that the exhaust gas flows into the first flow cross section of the heat transfer elements 21, flows through the heat transfer elements 21 in the longitudinal direction L; after it has flown out of the particular fin element 28, it is deflected within the heat transfer elements 21 and flows again through the heat transfer elements 21 in the longitudinal direction L as well as flows out again of the second flow cross section of the heat transfer elements 21. The flow guide means 32 consequently serves as a partition wall for the exhaust gas flowing into the heat exchanger 20 and out of the heat exchanger 20.

During the assembly of device 1 the individual components of the heat exchanger 20 are fitted together, retained by means of the profiled retaining section 31, developed as a solder frame, and subsequently soldered together.

The device 1 preferably comprises additionally a flow guidance element 33 of a plastic material for the coolant. The flow guidance element 33 could alternatively also be comprised of a metal, for example aluminum or stainless steel.

The flow guidance element 33, advantageously implemented as a single-piece component, has the form of a casing element encompassing the heat exchanger 20 at the longitudinal sides with a first front face, open in the longitudinal direction L, and an open second front face. After the assembly of the heat transfer elements 21 to form the heat exchanger 20, the integrally developed flow guidance element 33 is slid over the heat exchanger 20. According to an alternative embodiment, the flow guidance element is comprised separately of two components which, after the assembly of the heat transfer elements 21 to form the heat exchanger 20, is disposed about the heat exchanger 20.

The shape and outer dimensions of the flow guidance element 33 correspond herein to the shape and the inner dimensions of the wall of the receiving element 2a of housing 2 less an amount for forming clearance and a gap for introducing the flow guidance element 33 into the receiving element 2a. The inner dimensions of the wall of the flow guidance element 33 are such that the flow guidance element 33 encompasses the heat exchanger 20 wherein between the inside of the wall of the flow guidance element 33 and the heat exchanger 20 a gap remains for the throughflow of the coolant. In the assembled state of device 1 the flow guidance element 33 is consequently disposed between the wall of the receiving element 2a and the heat exchanger 20.

The extent of the flow guidance element 33 in the longitudinal direction L corresponds approximately to the extent of the heat exchanger 20 in the longitudinal direction L, wherein the flow guidance element 33 can also be shorter.

At a first narrow side facing the inlet sector 12 of the coolant into the housing 2, 2a, the wall of the flow guidance element 33 is provided with an outforming 34, inlet openings 25 and a flow gap 36.

The outforming 34 is herein formed to correspond to the wall forming the inlet sector 12 of housing 2, 2a such that the wall forming the flow guidance element 33 in the proximity of the outforming 34 is in contact over its surface on the wall of the inlet sector 12 of housing 2, 2a and the coolant flowing in through the inlet sector 12 is guided specifically to the inlet openings 35 and through the flow gap 36.

The inlet openings 35 having substantially a rectangular flow cross-section are disposed in three rows one above the other in the direction of height H. Each row oriented in the longitudinal direction L comprises five inlet openings 35. The inlet openings 35 of a row are each developed with equal-sized flow cross sections, wherein the inlet openings 35 of a first row have greater flow cross sections than the inlet openings 35, disposed above the first row in the direction of height H, of a second or third row. Against the inlet openings 35 of the first row the flow in the flow direction 5 of the coolant is directed on the shortest path. When flowing into the flow guidance element 33 the coolant is divided into mass subflows through the inlet openings 35 as well as into a mass subflow through the flow gap 36.

The flow gap 36 is developed at a transition from the first narrow side developed with the inlet openings 35 to a first broadside adjoining the first narrow side of the flow guidance element 33. The gap extends in the longitudinal direction L and is at least of a length that corresponds to the length of one of the rows of the inlet openings 35. While the mass subflows of the coolant, guided through the inlet openings 35 into the flow guidance element 33, substantially flow in from the side, and therewith in a flow direction extending in the direction of width W, a mass subflow of the coolant guided through the flow gap 36 substantially flows in a direction of flow in the direction of height H from below into the flow guidance element 33. Following their inflow into the flow guidance element 33, the mass subflows of coolant guided about the heat transfer element 21 are mixed with one another.

In addition, the wall of flow guidance element 33 is provided with a cutout 37 on a second broadside facing the outlet opening 4 of the coolant of housing 2, 2a. The cutout 37 extends from the first front face, oriented toward the open front face of the receiving element 2a, of the flow guidance element 33 in the longitudinal direction L and has a specific width. The width and length of the cutout 37 amount each to maximally half of the particular total extent of the flow guidance element 33 in the corresponding direction with respect to width W and length L.

The second narrow side of flow guidance element 33, which is located opposite the first narrow side provided with the inlet openings 35, is shortened in the longitudinal direction in comparison to the first narrow side and has the length of the second broadside in the proximity of cutout 37. Consequently, the cutout 37 is developed at a transition from the second broadside to the second narrow side, adjoining the second broadside, of flow guidance element 33.

The narrow sides as well as also the longitudinal sides of flow guidance element 33 are aligned with respect to one another on the second front face of flow guidance element 33.

During operation of device 1 the exhaust gas flows in the interior of heat exchanger 20, in particular in the interior of the heat transfer elements 21. About the heat transfer elements 21 additionally flows liquid coolant, for example water or a mixture of water and glycol. The coolant flows consequently through the device 1 in the interspaces on the outside of the heat transfer elements 21 as well as between the heat transfer elements 21 and an inside of the wall of housing 2 or an inside of flow guidance element 33.

With the development of flow guidance element 33, the coolant is specifically guided along the outside of heat transfer elements 21. The flow guidance element 33 defines the throughflow of the coolant about the heat exchanger 20 and herein guides the coolant through the interspaces developed between the heat transfer elements 21 as well as between the heat transfer elements 21 and the wall of the flow guidance element 33 and prevents mass leakage flows through unintentional bypasses.

By means of flow guidance element 33 the mass flow of the coolant is guided specifically and purposefully through the heat exchanger 20 and an optimal flow of the coolant between the heat transfer elements 21 and about the heat transfer elements 21 is ensured in order to optimize the heat transfer from the exhaust gas to the coolant and to prevent an undesirable flow path of the coolant. Herein in particular the heat transfer in the inlet sector of the hot exhaust gas and of the coolant into the device 1 is maximized in order to avoid, for example, the occurrence of thermal stresses in the material of the components as well as the boiling of the coolant. After it has flowed into the device 1, the coolant is first guided with the flow guidance element 33 into the sector of the exhaust gas inlet in which the exhaust gas has the highest temperature and energy and in which maximal cooling capacity is provided.

The optimal flow distribution of the coolant, in turn, effects a potential for decreasing the particular flow cross sections and therewith the potential for decreasing the necessary installation space of device 1.

During the production of device 1 one first jacket element 22 and one second jacket element 23 with a fin element 28 disposed between them are fitted together such that the open throughflow sector 27 is generated and the side edges 26 are in contact on one another.

The heat transfer elements 21 fitted together in this manner are stacked as plates one above the other and fixed at the longitudinal sides by means of securement elements 30 as well as at the throughflow sector 27 by means of the profiled retaining section 31. The components of the heat exchanger 20 are subsequently soldered or welded together.

Through the assembly of the flow guide means 32 for the exhaust gas in the proximity of the center of the throughflow sectors 27, developed as open end sections, of the heat transfer elements 21, the U-shaped flow channel for the exhaust gas is formed in the interior of the heat transfer elements 21. Additional components and means can herein be omitted.

The disposition of the profiled retaining section 31 serves also for securing the heat exchanger 20 within the housing 2.

After the components of heat exchanger 20 have been connected, the flow guidance element 33 is slid over the outside located heat transfer elements 21 of heat exchanger 20 or placed about the heat exchanger 20.

Together with the flow guidance element 33, the heat exchanger 20 is slid into the receiving element 2a of housing 2. The housing 2 is closed by emplacing the sealing element 11 and the cover element 2b and preferably connected across threaded connections.

The heat exchanger 20 is consequently implemented of plates or flat tubes with fin elements 28 developed as wavy inner fins. The open ends of the heat transfer elements 21 defining the throughflow sector 27 are in contact on the cover element 2b of housing 2, while the heat transfer elements 21 otherwise are not connected with housing 2, in particular with the receiving element 2a.

LIST OF REFERENCE NUMBERS

1 Device
2, 2a Housing, receiving element
2, 2b Housing, cover element
3 Inlet, inlet opening coolant
4 Outlet, outlet opening coolant
5 Flow direction coolant
6 Inlet, inlet opening exhaust gas
7 Outlet, outlet opening exhaust gas
8 Flow direction exhaust gas
9 Flow guidance element exhaust gas
10 Connection element
11 Sealing element housing 2, 2a, 2b
12 Inlet sector coolant housing 2, 2a
20 Heat exchanger
21 Heat transfer element
22 First, upper jacket element
23 Second, lower jacket element
24 Inside jacket element 22, 23
25 Outside jacket element 22, 23
26 Side edge jacket element 22, 23
27 Throughflow sector exhaust gas heat transfer element 21
28 Fin element heat transfer element 21
29 Outforming jacket element 22, 23
30 Securement element
31 Profiled retaining section
32 Flow guide means
33 Flow guidance element coolant
34 Outforming flow guidance element 33
35 Inlet openings of flow guidance element 33 coolant
36 Flow gap
37 Cutout flow guidance element 33 coolant
W Width direction
H Height direction
L Longitudinal direction

The invention claimed is:

1. A device for heat transfer for exhaust gas cooling in motor vehicles, comprising a housing with a heat exchanger disposed within a volume completely enclosed by the housing,
   wherein the housing is developed in two parts with a receiving element and a cover element and the heat exchanger is integrated within the receiving element, the heat exchanger is developed of heat transfer elements disposed in parallel and through which flows a first fluid to be cooled and around which flows a liquid second fluid,
   wherein each of the heat transfer elements is developed in the shape of a plate from a first jacket element and a second jacket element as well as a fin element and each comprises a throughflow sector for the inflow and outflow of the first fluid, wherein the throughflow sector in each instance is developed on a first front face of the heat transfer element and the fin element has in a longitudinal direction (L) a lesser dimension than the jacket elements as well as being disposed between the jacket elements such that in the proximity of a second front face, disposed distally with respect to the first front face, of the heat transfer element a free region for the deflection of the direction of flow of the first fluid is generated.

2. The device according to claim 1, wherein the cover element is provided with an inlet opening for the second fluid as well as an inlet opening and an outlet opening for the first fluid and that the receiving element is provided with an outlet opening of the second fluid.

3. The device according to claim 1, wherein in the throughflow sector of the heat transfer elements a strip-form flow guide means is developed in a direction of height (H)

that is orthogonal to the longitudinal direction (L), which flow guide means divides each throughflow sector into two flow cross sections for the first fluid.

4. The device according to claim 1, wherein within the receiving element of housing a flow guidance element for the second fluid is disposed, whose wall is developed such that it encompasses the heat exchanger at least at the side faces bordering the front faces.

5. The device according to claim 4, wherein a form and outer dimensions of the wall of the flow guidance element correspond to a form and inner dimensions of the wall of the receiving element less an amount for developing a gap for the introduction of the flow guidance element into the receiving element.

6. The device according to claim 4, wherein inner dimensions of the wall of the flow guidance element are dimensioned such that between an inside of the wall of the flow guidance element and the heat exchanger a gap is developed for the throughflow of the second fluid.

7. The device according to claim 4, wherein the wall of the flow guidance element is developed on a first narrow side with inlet openings and/or a flow gap for the second fluid to flow into a volume enclosed by the flow guidance element.

8. The device according to claim 7, wherein the inlet openings are disposed next to one another in the height direction (H) and in the longitudinal direction (L).

9. The device according to claim 8, wherein the inlet openings are disposed in three rows in the direction of height (H) one above the other, wherein each row oriented in the longitudinal direction (L) comprises at least two inlet openings.

10. The device according to claim 9, wherein each of the inlet openings of a row have flow cross sections of equal size.

11. The device according to claim 4, wherein the wall of the flow guidance element is developed with a cutout on a broadside facing an outlet opening of the second fluid of housing.

12. The device according to claim 11, wherein the cutout extends from a first front face, oriented toward an open front face of the receiving element, of the flow guidance element in the longitudinal direction (L).

13. The device according to claim 4, wherein the flow guidance element is developed as a single-piece component.

14. A device for heat transfer for exhaust gas cooling in motor vehicles comprising:
   a housing;
   a heat exchanger disposed within a volume completely enclosed by the housing;
   the housing comprising a receiving element and a cover element;
   the heat exchanger being integrated within the receiving element;
   the heat exchanger comprising heat transfer elements disposed in parallel and through which flows a first fluid to be cooled and around which flows a liquid second fluid;
   the each of the heat transfer elements being in the shape of a plate and comprising a first jacket element, a second jacket element, and a fin element;
   a top of the first jacket element forming a top of each of the heat transfer elements;
   a bottom of the second jacket element forming a bottom of each of the heat transfer elements;
   the fin element being located in between the first jacket element and the second jacket element;
   a throughflow sector being formed between each of the first jacket element and the second jacket element for inflow and outflow of the first fluid;
   the inflow of the first fluid through the throughflow sector in each instance beginning at a front face of the heat transfer element, wherein the front face is perpendicular to the top of the first jacket element and perpendicular to the bottom of the second jacket element;
   the length of the fin element in the direction perpendicular to the front face of the heat transfer element being less than the length of the first and second jacket elements in the direction perpendicular to the front face of the heat transfer element;
   the inflow of first fluid beginning at a front face of the fin element, wherein the front face of the fin element is perpendicular to the top of the first jacket element and perpendicular to the bottom of the second jacket element; and
   the throughflow sector including a free region for the deflection of the direction of flow of the first fluid in a flow path after the fin element because the length of the fin element in the direction perpendicular to the front face of the heat transfer element is less than the length of the first and second jacket elements in the same direction.

15. A device for heat transfer for exhaust gas cooling in motor vehicles comprising:
   a housing;
   a heat exchanger disposed within a volume completely enclosed by the housing;
   the housing comprising a receiving element and a cover element;
   the heat exchanger being integrated within the receiving element;
   the heat exchanger comprising heat transfer elements disposed in parallel and through which flows a first fluid to be cooled and around which flows a liquid second fluid;
   the each of the heat transfer elements being in the shape of a plate and comprising a first jacket element, a second jacket element, and a fin element;
   a top of the first jacket element forming a top of each of the heat transfer elements;
   a bottom of the second jacket element forming a bottom of each of the heat transfer elements;
   the fin element being located in between the first jacket element and the second jacket element;
   the each of the heat transfer elements comprising a throughflow sector for inflow and outflow of the first fluid;
   the inflow of the first fluid through the throughflow sector in each instance beginning at a front face of the heat transfer element, wherein the front face is perpendicular to the top of the first jacket element and perpendicular to the bottom of the second jacket element;
   the outflow of the first fluid from the throughflow sector in each instance beginning at the front face of the heat transfer element;
   the length of the fin element in the direction perpendicular to the front face of the heat transfer element being less than the length of the first and second jacket elements in the direction perpendicular to the front face of the heat transfer element;
   the inflow of first fluid beginning at a front face of the fin element, wherein the front face of the fin element is perpendicular to the top of the first jacket element and perpendicular to the bottom of the second jacket element; and the throughflow sector including a free region for the deflection of the direction of flow of the first fluid in a flow path, wherein the free region is formed between the first jacket element and the second jacket element and is formed at a distal end farthest away from the front face of the heat transfer element.

* * * * *